US012010018B2

United States Patent
Sun et al.

(10) Patent No.: US 12,010,018 B2
(45) Date of Patent: Jun. 11, 2024

(54) WIRELESS COMMUNICATION METHOD AND DEVICE

(71) Applicant: Huawei Technologies Co., Ltd., Shenzhen (CN)

(72) Inventors: Dekui Sun, Shenzhen (CN); Han Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 98 days.

(21) Appl. No.: 17/100,359

(22) Filed: Nov. 20, 2020

(65) Prior Publication Data

US 2021/0075723 A1    Mar. 11, 2021

Related U.S. Application Data

(63) Continuation of application No. PCT/CN2019/087568, filed on May 20, 2019.

(30) Foreign Application Priority Data

May 21, 2018 (CN) .......................... 201810491439.7

(51) Int. Cl.
*H04L 45/74* (2022.01)
*H04L 12/18* (2006.01)
(Continued)

(52) U.S. Cl.
CPC ............ *H04L 45/74* (2013.01); *H04L 12/189* (2013.01); *H04L 45/16* (2013.01); *H04W 4/06* (2013.01); *H04W 4/40* (2018.02)

(58) Field of Classification Search
CPC ....... H04L 12/189; H04L 45/16; H04L 45/47; H04L 47/825; H04L 51/214; H04W 4/06; H04W 4/08; H04W 4/40
See application file for complete search history.

(56) References Cited

U.S. PATENT DOCUMENTS

2010/0195649 A1* 8/2010 Miyata .................... H04L 45/24
370/390
2017/0295093 A1* 10/2017 Moreno .............. H04L 12/4641
(Continued)

FOREIGN PATENT DOCUMENTS

CN    103986710 A    8/2014
CN    106487690 A    3/2017
(Continued)

OTHER PUBLICATIONS

Li, "A Multicast Message Transmitting Method, Device and System," English Machine Translation of Li (CN 110012437 A), Clarivate Analytics, pp. 1-32 (Year: 2023).*
(Continued)

*Primary Examiner* — Khaled M Kassim
*Assistant Examiner* — Kai Chang
(74) *Attorney, Agent, or Firm* — Conley Rose, P.C.

(57) ABSTRACT

A wireless communication method includes receiving, by a first user plane function (UPF) entity, a first message sent by a session management function (SMF) entity, where the first message includes a multicast address of a group and session information of at least one second terminal, and duplicating, by the first UPF entity, received first service data to obtain N copies of first service data, and sending the duplicated first service data to each second terminal based on the multicast address and the session information of the at least one second terminal, where the first service data is data that is from a first terminal and whose destination address is the multicast address, and N is a total quantity of the at least one second terminal.

20 Claims, 7 Drawing Sheets

(51) Int. Cl.
   *H04L 45/16* (2022.01)
   *H04W 4/06* (2009.01)
   *H04W 4/40* (2018.01)

(56) References Cited

U.S. PATENT DOCUMENTS

| | | | | |
|---|---|---|---|---|
| 2018/0359795 | A1* | 12/2018 | Baek | H04W 48/18 |
| 2019/0116521 | A1* | 4/2019 | Qiao | H04L 69/04 |
| 2019/0124572 | A1* | 4/2019 | Park | H04W 80/10 |
| 2019/0158408 | A1* | 5/2019 | Li | H04L 67/104 |
| 2019/0313468 | A1* | 10/2019 | Talebi Fard | H04W 76/12 |
| 2020/0053562 | A1* | 2/2020 | Kim | H04W 12/062 |
| 2020/0077357 | A1* | 3/2020 | Park | H04W 8/02 |
| 2020/0267513 | A1* | 8/2020 | Zhu | H04L 65/1033 |
| 2020/0344576 | A1* | 10/2020 | Li | H04L 12/185 |
| 2021/0029515 | A1* | 1/2021 | Han | H04L 12/185 |
| 2021/0058748 | A1* | 2/2021 | Liao | H04W 76/11 |
| 2021/0076164 | A1* | 3/2021 | Navratil | H04M 15/66 |
| 2021/0076166 | A1* | 3/2021 | Navratil | H04W 4/08 |
| 2021/0211233 | A1* | 7/2021 | Zhang | H04L 45/28 |

FOREIGN PATENT DOCUMENTS

| | | | | |
|---|---|---|---|---|
| CN | 107094117 | A | | 8/2017 |
| CN | 110012437 | A * | 7/2019 | H04W 28/08 |
| EP | 3700223 | A1 | | 8/2020 |
| WO | 2017220023 | A1 | | 12/2017 |
| WO | 2018067956 | A1 | | 4/2018 |
| WO | 2018085635 | A1 | | 5/2018 |

OTHER PUBLICATIONS

Nokia, et al., "Different types of Ethernet services and N4," SA WG2 Meeting #127, S2-184600, Apr. 16-20, 2018, Sanya, P.R. China, 6 pages.

3GPP TS 22.186 V15.2.0, "3rd Generation Partnership Project; Technical Specification Group Services and System Aspects; Enhancement of 3GPP support for V2X scenarios; Stage 1 (Release 15)," Sep. 2017, 16 pages.

3GPP TS 23.501 V15.1.0, "3rd Generation Partnership Project; Technical Specification Group Services and System Aspects; System Architecture for the 5G System; Stage 2 (Release 15)," Mar. 2018, 201 pages.

3GPP TS 29.244 V15.1.0, "3rd Generation Partnership Project; Technical Specification Group Core Network and Terminals; Interface between the Control Plane and the User Plane Nodes; Stage 3 (Release 15)," Mar. 2018, 170 pages.

Huawei, et al., "Solution to Support IPTV Service," S2-184153, (revision of S2-183273), SA WG2 Meeting #127, Apr. 16-20, 2018, Sanya, China, 8 pages.

* cited by examiner

WIRELESS COMMUNICATION METHOD AND DEVICE

CROSS-REFERENCE TO RELATED APPLICATIONS

This application is a continuation of International Patent Application No. PCT/CN2019/087568 filed on May 20, 2019, which claims priority to Chinese Patent Application No. 201810491439.7 filed on May 21, 2018, both of which are hereby incorporated by reference in their entireties.

TECHNICAL FIELD

Embodiments of this application relate to communications technologies, and in particular, to a wireless communication method and a device.

BACKGROUND

One of development goals of mobile communication is to establish a wide interworking network including various types of terminals, which is also one of starting points for current development of the Internet of Things in a cellular communication framework. An Internet of Vehicles communications technology such as vehicle-to-everything (V2X) communication including vehicle-to-vehicle communication, vehicle-to-infrastructure communication, vehicle-to-pedestrian communication, and the like, is becoming a new highlight of the Internet of Vehicles, and is a key technology of a future intelligent transportation system, thereby implementing communication between vehicles, between a vehicle and a base station, and between base stations. Therefore, a series of traffic information such as a real-time road condition, road information, and pedestrian information is obtained, thereby improving traffic safety and reducing a traffic accident rate.

A 5th generation mobile communication technology (5G) technical standard release (5G TS22.186) summarizes application requirements and scenarios of the Internet of Vehicles, including four major scenarios a platooning service (e.g. a vehicle formation driving service), a remote driving service, a sensor data sharing service scenario, and an automated driving service scenario. Currently, the platooning service is a most valued service. In a platooning service scenario, a specific quantity of vehicles form a platoon to travel on a road. Like a train, a lead vehicle (a first vehicle) is responsible for management of the entire platoon, distribution of driving information, and communication between the platoon and an external environment (for example, an application server). A specific communication mechanism is as follows. The lead vehicle collects vehicle body surrounding information collected by all members in the platoon (other members send information such as sensor data collected by the members to the lead vehicle), makes a driving decision (for example, performing acceleration, making a lane change, and maintaining a current status) based on the information, and sends the driving decision to the other members.

5G TS22.186 clearly states that a 3rd Generation Partnership Project (3GPP) network is required to take optimization measures for vehicle to vehicle communication in a V2X platoon.

SUMMARY

Embodiments of this application provide a wireless communication method and a device, to implement a wireless communication method applied to V2X.

According to a first aspect, an embodiment of this application provides a wireless communication method, including receiving, by a first user plane function (UPF) entity, a first message sent by a session management function (SMF) entity, where the first message includes a multicast address of a group and session information of at least one second terminal, and duplicating, by the first UPF entity, received first service data to obtain N copies of first service data, and sending the duplicated first service data to each second terminal based on the multicast address and the session information of the at least one second terminal, where the first service data is data that is from a first terminal and whose destination address is the multicast address, and N is a total quantity of the at least one second terminal.

Beneficial effects of the first aspect in this embodiment of this application are as follows. The first UPF entity receives the first message sent by the SMF entity, duplicates the received first service data in the first message to obtain the N copies of first service data, and sends the duplicated first service data to each second terminal based on the multicast address and the session information of the at least one second terminal. In this way, a wireless communication method applied to V2X can be implemented. Because the first UPF entity duplicates the first service data and sends the duplicated first service data to each second terminal, bandwidth consumed for communication between the first terminal and the at least one second terminal can be reduced in comparison with a one-to-one communication mode, thereby optimizing a vehicle to vehicle communication mode and a vehicle to infrastructure communication mode.

With reference to the first aspect, in a possible implementation of the first aspect, the session information of the at least one second terminal includes information about a tunnel between a radio access network (RAN) of each second terminal and the first UPF entity, and the duplicating, by the first UPF entity, received first service data to obtain N copies of first service data, and sending the duplicated first service data to each second terminal based on the multicast address and the session information of the at least one second terminal includes storing, by the first UPF entity, a group route corresponding to the multicast address, where the group route includes the information about the tunnel between the RAN of each second terminal and the first UPF entity, and duplicating, by the first UPF entity, the received first service data to obtain the N copies of first service data, and sending the duplicated first service data to each second terminal based on the group route corresponding to the multicast address.

Beneficial effects of a possible implementation of the first aspect in this embodiment of this application are as follows. The first UPF entity stores the group route corresponding to the multicast address, where the group route includes the information about the tunnel between the RAN of each second terminal and the first UPF entity, and when receiving the first service data, the first UPF entity duplicates the first service data to obtain the N copies of first service data, and directly sends, based on the group route, the duplicated first service data to each corresponding tunnel based on the information about the tunnel between the RAN of each second terminal and the first UPF entity, to send the duplicated first service data to each second terminal. Because the first UPF entity stores the group route corresponding to the multicast address, when receiving the first service data, the first UPF entity may duplicate the first service data and send the duplicated first service data to each second terminal based on the group route, to implement group communication.

With reference to the first aspect, in another possible implementation of the first aspect, the session information of the at least one second terminal includes address information of each second terminal, and the duplicating, by the first UPF entity, received first service data to obtain N copies of first service data, and sending the duplicated first service data to each second terminal based on the multicast address and the session information of the at least one second terminal includes storing, by the first UPF entity, a group route corresponding to the multicast address, where the group route includes the address information of each second terminal, and obtaining, by the first UPF entity, the address information of each second terminal based on the group route corresponding to the multicast address, determining information about a tunnel between a RAN of each second terminal and the first UPF entity based on the address information of each second terminal, duplicating the received first service data to obtain the N copies of first service data, and sending the duplicated first service data to each second terminal through the tunnel corresponding to the information about the tunnel between the RAN of each second terminal and the first UPF entity.

Beneficial effects of another possible implementation of the first aspect in this embodiment of this application are as follows. The first UPF entity stores the group route corresponding to the group address, where the group route includes the address information of each second terminal, and when receiving the first service data, the first UPF entity may determine information about each tunnel based on the group route, duplicate the received first service data to obtain the N copies of first service data, and send the duplicated first service data to each second terminal through the tunnel corresponding to the information about each tunnel, to implement group communication.

With reference to the first aspect, in another possible implementation of the first aspect, the session information of the at least one second terminal includes information about a tunnel between a second UPF entity in which each second terminal is located and the first UPF entity, and the duplicating, by the first UPF, received first service data to obtain N copies of first service data, and sending the duplicated first service data to each second terminal based on the multicast address and the session information of the at least one second terminal includes storing, by the first UPF, a group route corresponding to the multicast address, where the group route includes the information about the tunnel between the second UPF entity in which each second terminal is located and the first UPF entity, and duplicating, by the first UPF entity, the received first service data to obtain the N copies of first service data, and sending the duplicated first service data to each second terminal through the second UPF entity in which each second terminal is located based on the group route corresponding to the multicast address.

Beneficial effects of a possible implementation of the first aspect in this embodiment of this application are as follows. The first UPF entity stores the group route corresponding to the multicast address, where the group route includes the information about the tunnel between the second UPF entity in which each second terminal is located and the first UPF entity, and when receiving the first service data, the first UPF entity duplicates the first service data to obtain the N copies of first service data, and sends, based on the group route, the duplicated first service data to each corresponding tunnel based on the information about the tunnel between the second UPF entity in which each second terminal is located and the first UPF entity, so that the duplicated first service data is sent to each second terminal through the second UPF entity in which each second terminal is located, to implement group communication.

With reference to the first aspect, in another possible implementation of the first aspect, the session information of the at least one second terminal includes address information of each second terminal and information about a tunnel between a second UPF entity in which each second terminal is located and the first UPF, and the duplicating, by the first UPF entity, received first service data to obtain N copies of first service data, and sending the duplicated first service data to each second terminal based on the multicast address and the session information of the at least one second terminal includes storing, by the first UPF entity, a group route corresponding to the multicast address, where the group route includes the address information of each second terminal and the information about the tunnel between the second UPF entity in which each second terminal is located and the first UPF entity, and duplicating, by the first UPF entity, the received first service data to obtain the N copies of first service data, and sending the duplicated first service data to each second terminal based on the group route corresponding to the multicast address.

Beneficial effects of a possible implementation of the first aspect in this embodiment of this application are as follows. The first UPF entity stores the group route corresponding to the group address, where the group route includes the address information of each second terminal and information about each tunnel, and when receiving the first service data, the first UPF entity may determine the information about each tunnel based on the group route, duplicate the received first service data to obtain the N copies of first service data, and send the duplicated first service data to each second terminal through the tunnel corresponding to the information about each tunnel, to implement group communication.

With reference to any one of the first aspect and the possible implementations of the first aspect, in another possible implementation of the first aspect, the method further includes modifying, by the first UPF entity, a destination address of each of the N copies of duplicated first service data to an address of a second terminal that is in the at least one second terminal and to which the duplicated first service data is to be sent.

Beneficial effects of a possible implementation of the first aspect in this embodiment of this application are as follows. The first UPF entity modifies a destination address of duplicated first service data to an address of a corresponding second terminal, so that the second terminal that receives the duplicated first service data can be correctly identified. In addition, a network side does not need to send the multicast address to each second terminal by using signaling, so that signaling overheads can be reduced.

According to a second aspect, an embodiment of this application provides a wireless communication method, including receiving, by a SMF entity, a group route establishment request message, where the group route establishment request message includes address information of a first terminal in a group and address information of at least one second terminal in the group, determining, by the SMF entity, a first UPF entity based on the address information of the first terminal, and sending, by the SMF entity, a first message to the first UPF entity, where the first message includes a multicast address of the group and session information of the at least one second terminal, the first message is used by the first UPF entity to send received first service data to each second terminal, and the first service data is data that is from the first terminal and whose destination address is the multicast address.

Beneficial effects of the second aspect in this embodiment of this application are as follows. The SMF entity receives the group route establishment request message, and sends the multicast address of the group and the session information of the at least one second terminal to the first UPF entity, so that the first UPF entity can duplicate the received first service data to obtain N copies of first service data, and send the duplicated first service data to each second terminal based on the multicast address and the session information of the at least one second terminal. In this way, a wireless communication method applied to V2X can be implemented. Because the first UPF entity duplicates the first service data and sends the duplicated first service data to each second terminal, bandwidth consumed for communication between the first terminal and the at least one second terminal can be reduced in comparison with a one-to-one communication mode, thereby optimizing a vehicle to vehicle communication mode and a vehicle to infrastructure communication mode.

With reference to the second aspect, in a possible implementation of the second aspect, the method further includes determining, by the SMF entity, each second UPF entity based on the address information of the at least one second terminal, where when the first UPF entity and each second UPF entity are a same function entity, the session information of the at least one second terminal includes information about a tunnel between a RAN of each second terminal and the first UPF entity, or address information of each second terminal.

Beneficial effects of a possible implementation of the second aspect in this embodiment of this application are as follows. When the SMF entity determines that the first UPF entity and each second UPF entity are a same function entity, the session information of the at least one second terminal sent by the SMF entity includes the information about the tunnel between the RAN of each second terminal and the first UPF entity, or the address information of each second terminal, so that the first UPF entity establishes, based on the foregoing information, a group route corresponding to the multicast address, to implement group communication.

With reference to the second aspect, in another possible implementation of the second aspect, the method further includes determining, by the SMF entity, each second UPF entity based on the address information of the at least one second terminal, where when the first UPF entity and each second UPF entity are different function entities, the session information of the at least one second terminal includes information about a tunnel between a second UPF entity in which each second terminal is located and the first UPF entity, or address information of each second terminal and information about a tunnel between a second UPF entity in which each second terminal is located and the first UPF entity.

Beneficial effects of a possible implementation of the second aspect in this embodiment of this application are as follows. When the SMF entity determines that the first UPF entity and each second UPF entity are different function entities, the session information of the at least one second terminal sent by the SMF entity includes the information about the tunnel between the second UPF entity in which each second terminal is located and the first UPF entity, or the address information of each second terminal and the information about the tunnel between the second UPF entity in which each second terminal is located and the first UPF entity, so that the first UPF entity establishes, based on the foregoing information, a group route corresponding to the multicast address, to implement group communication.

With reference to any one of the second aspect and the possible implementations of the second aspect, in another possible implementation of the second aspect, the method further includes sending, by the SMF entity, a second message to a second UPF entity in which a second terminal X in the at least one second terminal is located, where the second message includes information about a tunnel between the second UPF entity in which the second terminal X is located and the first UPF entity, the second message is further used by the second UPF entity in which the second terminal X is located to send received second service data to the second terminal X, and the second service data is from the tunnel corresponding to the information about the tunnel between the second UPF entity in which the second terminal X is located and the first UPF entity.

Beneficial effects of a possible implementation of the second aspect in this embodiment of this application are as follows. The SMF entity sends the information about the tunnel between the second UPF entity in which the second terminal X is located and the first UPF entity to the first UPF entity and the second UPF entity in which the second terminal X is located, to establish the tunnel between the second UPF entity in which the second terminal X is located and the first UPF, thereby implementing sending of service data.

With reference to any one of the second aspect and the possible implementations of the second aspect, in another possible implementation of the second aspect, the first message further includes first instruction information, and the first instruction information is used to instruct the first UPF entity to modify a destination address of each of the N copies of duplicated first service data to an address of a second terminal that is in the at least one second terminal and to which the duplicated first service data is to be sent.

With reference to any one of the second aspect and the possible implementations of the second aspect, in another possible implementation of the second aspect, the first message further includes session information of the first terminal, and the session information of the first terminal includes information about a tunnel between a RAN of the first terminal and the first UPF entity, or the address information of the first terminal.

With reference to any one of the second aspect and the possible implementations of the second aspect, in another possible implementation of the second aspect, the second message further includes information about a tunnel between a RAN of the second terminal X and the second UPF entity in which the second terminal X is located, or address information of the second terminal X.

According to a third aspect, an embodiment of this application provides a wireless communications apparatus. The wireless communications apparatus may serve as a first UPF entity, and the wireless communications apparatus has a function of implementing behavior of the first UPF entity in any one of the possible implementations of the first aspect. The function may be implemented by hardware, or may be implemented by hardware executing corresponding software. The hardware or the software includes one or more modules corresponding to the function.

According to a fourth aspect, an embodiment of this application provides a wireless communications apparatus. The wireless communications apparatus may serve as an SMF entity, and the wireless communications apparatus has a function of implementing behavior of the SMF entity in any one of the possible implementations of the second aspect. The function may be implemented by hardware, or may be implemented by hardware executing corresponding software. The hardware or the software includes one or more modules corresponding to the function.

According to a fifth aspect, an embodiment of this application provides a communications device, and the communications device includes a processor, a memory, and a transceiver. The transceiver is coupled to the processor.

The memory is configured to store computer executable program code, where the program code includes an instruction, and when the processor executes the instruction, the instruction enables the communications device to perform the method in any one of the possible implementations of the first aspect.

The communications device may serve as a first UPF entity.

According to a sixth aspect, an embodiment of this application provides a communications device, and the communications device includes a processor, a memory, and a transceiver. The transceiver is coupled to the processor.

The memory is configured to store computer executable program code, where the program code includes an instruction, and when the processor executes the instruction, the instruction enables the communications device to perform the method in any one of the possible implementations of the second aspect.

The communications device may serve as an SMF entity.

According to a seventh aspect, an embodiment of this application provides a communications device, including an interface and a processor. The interface is coupled to the processor, and the processor is configured to perform the wireless communication method in any one of the possible implementations of the first aspect.

The communications device may be a first UPF entity or a chip in a first UPF entity. The memory and the processor may be integrated on a same chip or may be separately disposed on different chips.

According to an eighth aspect, an embodiment of this application provides a communications device, including an interface and a processor. The interface is coupled to the processor, and the processor is configured to perform the wireless communication method in any one of the possible implementations of the second aspect.

The communications device may be an SMF entity or a chip in an SMF. The memory and the processor may be integrated on a same chip or may be separately disposed on different chips.

According to a ninth aspect, an embodiment of this application provides a computer readable storage medium. The computer readable storage medium stores a computer program, the computer program includes at least one segment of code, and the at least one segment of code may be executed by a computer, so that the computer is enabled to perform the operations in any one of the possible implementations of the first aspect and the second aspect.

According to a tenth aspect, an embodiment of this application provides a computer program, and when the computer program is executed by a computer, the computer program is used to perform the operations in any one of the possible implementations of the first aspect and the second aspect.

The program may be entirely or partially stored in a storage medium that is encapsulated with a processor, or may be entirely or partially stored in a memory that is not encapsulated with a processor.

According to an eleventh aspect, an embodiment of this application provides a communications device, including a memory and a processor. The memory is coupled to the processor, and the processor is configured to perform the operations in any one of the possible implementations of the first aspect and the second aspect.

According to a twelfth aspect, an embodiment of this application provides a communications system, and the communications system includes the first UPF entity in any one of the possible implementations of the third aspect and the SMF entity in any one of the possible implementations of the fourth aspect.

BRIEF DESCRIPTION OF DRAWINGS

To describe the embodiments of the present disclosure more clearly, the following briefly describes the accompanying drawings required for describing the embodiments or other approaches.

DESCRIPTION OF EMBODIMENTS

The following clearly and completely describes the technical solutions in the embodiments of this application with reference to the accompanying drawings in the embodiments of this application.

Figure 1:
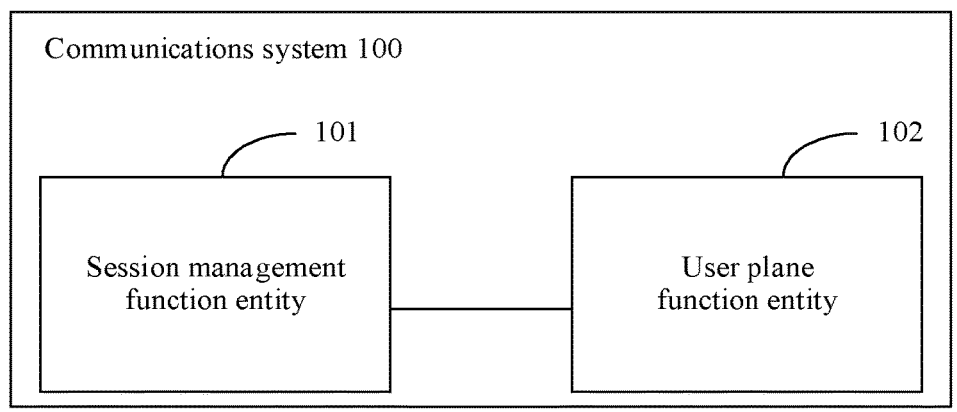
FIG. 1 is a schematic structural diagram of a communications system 100 according to an embodiment of this application.

FIG. 1 is a schematic structural diagram of a communications system 100 according to an embodiment of this application. As shown in FIG. 1, the communications system 100 in this embodiment may include an SMF entity 101 and a UPF entity 102, and the SMF entity 101 is communicatively connected to the UPF entity 102 for transmission.

It should be noted that there may be one or more UPF entities 102. When there is one UPF entity 102, the UPF entity 102 may serve as a first UPF entity. When there are a plurality of UPF entities 102, one of the UPF entities 102 may serve as a first UPF entity, and each of the other UPF entities 102 may serve as a second UPF entity.

The communications system 100 in this application can implement a wireless communication method applied to V2X, thereby optimizing a vehicle to vehicle communication mode and a vehicle to infrastructure communication mode.

Figure 2:
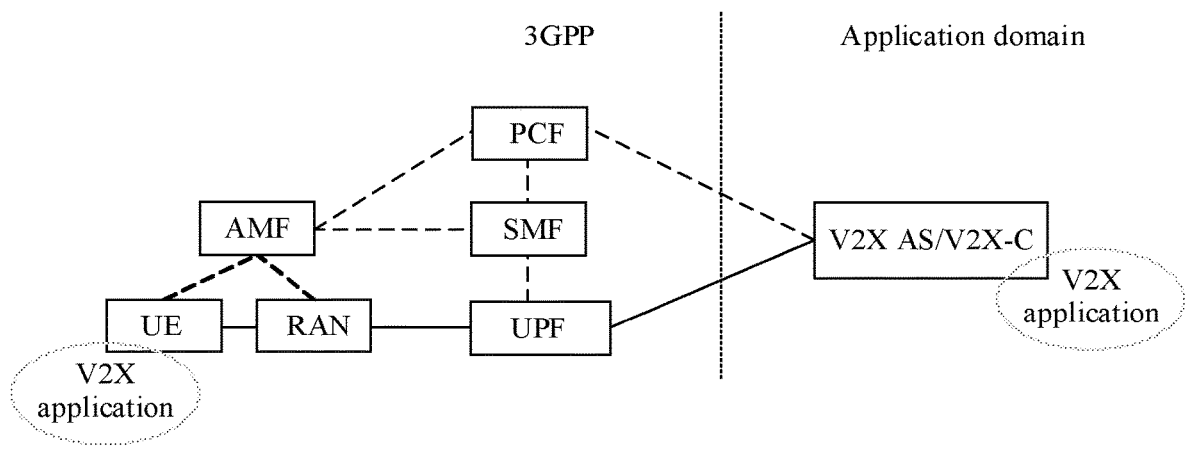
FIG. 2 is a schematic diagram of a system architecture according to an embodiment of this application.

FIG. 2 is a schematic diagram of a system architecture according to an embodiment of this application. The system architecture shown in FIG. 2 may be a specific representation form of the communications system shown in FIG. 1. As shown in FIG. 2, the system architecture in this embodiment may be referred to as a 5G network architecture. A core network function entity is divided into a UPF entity and a control plane function (CPF) entity. The UPF entity is mainly responsible for packet data packet sending, quality of service (QoS) control, charging information collection, or the like. The CPF entity is mainly responsible for user registration and authentication, mobility management, delivering a data packet sending policy or a QoS control policy to UPF entity, or the like. The CPF may be further subdivided into an access and mobility management function (AMF) entity, an SMF entity, and a policy control function (PCF) entity. Optionally, the AMF is responsible for performing a registration procedure during user access and location management in a user movement process. The SMF is responsible for establishing a corresponding session connection on a core network side when a user initiates a service, and providing a specific service or the like for the user.

Specifically, as shown in FIG. 2, a terminal used by a user may be connected to a UPF by using a RAN, an AMF is separately connected to the terminal, an SMF, and a PCF, the SMF is connected to the UPF, and the UPF is connected to a V2X application server (V2X AS) or a V2X control function (V2X-C) entity.

The V2X AS or the V2X-C entity is configured to receive a group establishment request message sent by a terminal (referred to as a first terminal in this application). The group establishment request message carries address information of a group member (referred to as a second terminal in this application). The V2X AS or the V2X-C sends address information of the first terminal and address information of at least one second terminal to the SMF by using a group route establishment request message.

Specifically, the AMF entity, the SMF entity, and the terminal shown in FIG. 2 may perform steps in the following method embodiment to implement vehicle to vehicle communication and vehicle to infrastructure communication.

It should be noted that the SMF entity, the UPF entity, and the like in the system architecture shown in FIG. 2 may have other functions in addition to the functions in this embodiment of this application. This is not specifically limited in this embodiment of this application.

It should be noted that a RAN device involved in this specification is a device for connecting a terminal to wireless network. The base station may be a base transceiver station (BTS) in Global System for Mobile Communications (GSM) or code-division multiple access (CDMA), a NodeB (NB) in wideband CDMA (WCDMA), or an evolved NB (eNB) in Long-Term Evolution (LTE), a relay station or an access point, a base station device in a future 5G network, or the like and is not specifically limited herein.

The terminal in this specification may also be referred to as a terminal device, user equipment (UE), a mobile station (MS), a mobile terminal (MT), or the like. The terminal device may be a mobile phone, a tablet computer (Pad), a computer with a wireless sending/receiving function, a virtual reality (VR) terminal, an augmented reality (AR) terminal, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like.

In this application, "a plurality of" refers to two or more than two. The term "and/or" describes an association relationship for describing associated objects and represents that three relationships may exist. For example, A and/or B may represent the following three cases. Only A exists, both A and B exist, and only B exists. The character "/" generally indicates an "or" relationship between the associated objects.

It should be noted that a "first UPF entity" and a "second UPF entity" in the embodiments of this application are merely used to distinguish between different UPF entities, and names of the UPF entities are not limited thereto.

A "first terminal" and a "second terminal" in the embodiments of this application are merely used to distinguish between terminals connected to different UPF entities, and names of the terminals are not limited thereto.

Figure 3:
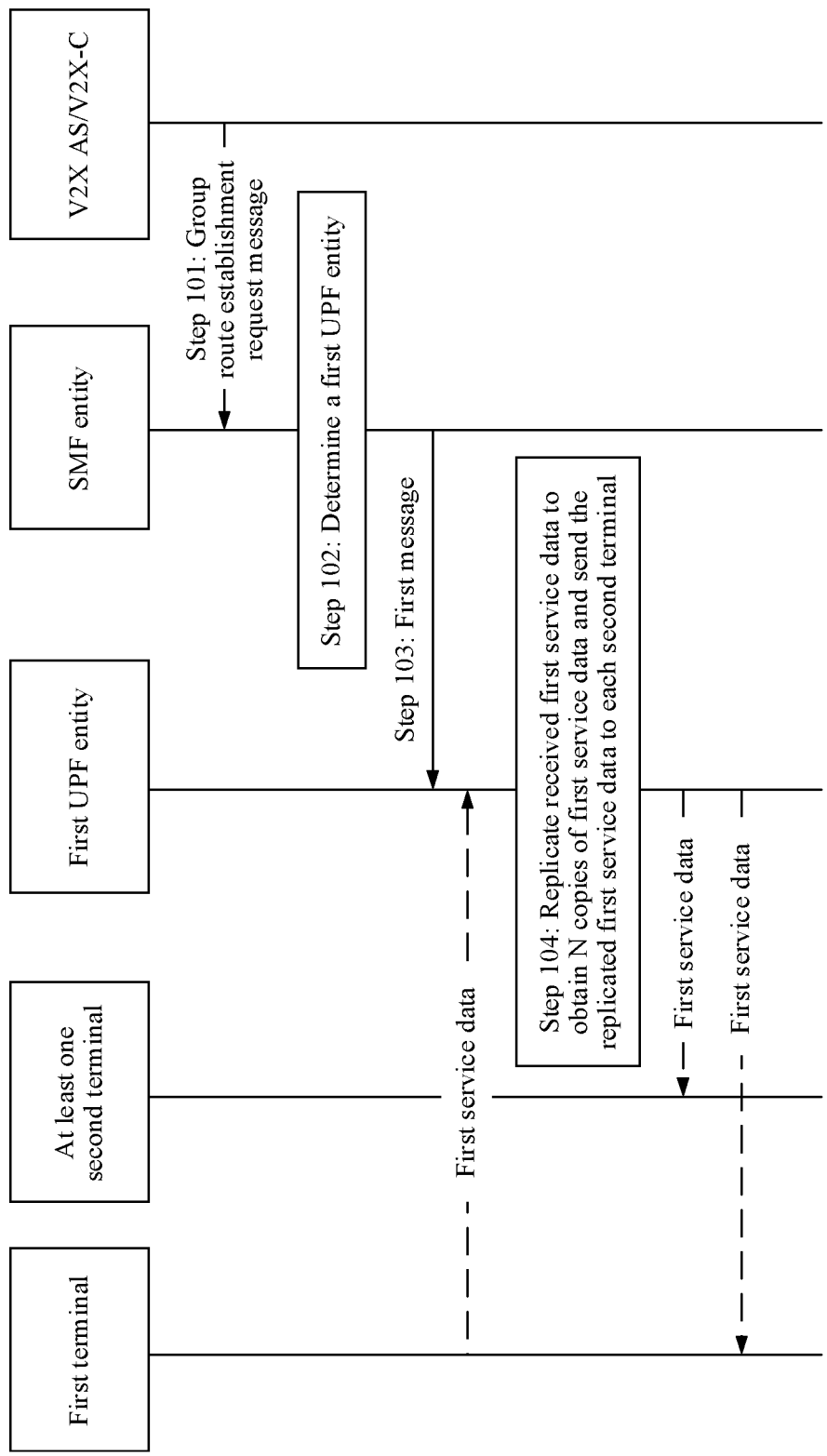
FIG. 3 is a flowchart of a wireless communication method according to an embodiment of this application.

FIG. 3 is a flowchart of a wireless communication method according to an embodiment of this application. As shown in FIG. 3, the method in this embodiment may include the following steps.

Step 101. A V2X AS/V2X-C sends a group route establishment request message to an SMF entity.

The SMF entity receives the group route establishment request message sent by the V2X AS/V2X-C.

The group route establishment request message includes address information of a first terminal in a group and address information of at least one second terminal in the group. The address information may be specifically an internet protocol (IP) address, that is, the address information of the first terminal is an IP address of the first terminal, and the address information of the at least one second terminal is an IP address of the at least one second terminal.

In an implementation, the V2X AS/V2X-C sends the group route establishment request message to the SMF entity by using a PCF entity.

It should be noted that the group route establishment request message may be another message name. This is not limited herein.

Step 102. The SMF entity determines a first UPF entity based on the address information of the first terminal The SMF entity may determine, based on the address information of the first terminal, a UPF entity in which the first terminal is located, and the UPF entity is referred to as the first UPF entity. Specifically, the SMF entity may obtain, based on the address information of the first terminal, a context of a packet data unit (PDU) session corresponding to the address information of the first terminal, and determine the first UPF entity based on the context.

Step 103. The SMF entity sends a first message to the first UPF entity.

The first UPF entity receives the first message sent by the SMF entity.

The first message includes a multicast address of the group and session information of the at least one second terminal, and the first message is used by the first UPF entity to send received first service data to each second terminal. The first service data is data that is from the first terminal and whose destination address is the multicast address.

In a possible implementation, the multicast address of the group may be from the group route establishment request message in step 101. In other words, the group route establishment request message may further carry the multicast address of the group.

In another possible implementation, the multicast address of the group may be allocated by the SMF entity to the group based on the group route establishment request message in step 101. In other words, the group route establishment request message may not carry the multicast address of the group, and the multicast address is allocated by the SMF entity.

The "session information" in this specification may include tunnel information or address information, or may include tunnel information and address information. The tunnel information may be specifically a tunnel identifier (ID), and the tunnel information is used to identify a data transmission tunnel between different UPF entities or between a UPF entity and a RAN. The address information is used to identify a terminal, a context of a PDU session of the terminal may be obtained based on address information of the terminal (for example, an IP address of the terminal), and the context of the PDU session includes tunnel information for sending data of the terminal.

It should be noted that the first message is merely a message name, and may be another message name, for example, an N4 session modification message.

Step 104. The first UPF entity duplicates the received first service data to obtain N copies of first service data, and sends the duplicated first service data to each second terminal based on the multicast address and the session information of the at least one second terminal.

N is a total quantity of the at least one second terminal. The first UPF entity establishes a correspondence between the multicast address and the session information of the at least one second terminal. When the first UPF entity receives the first service data, because a destination address of the first service data is the multicast address, the first UPF entity duplicates the first service data to obtain the N copies of first service data, and sends each copy of first service data to each second terminal based on the session information that is of the at least one second terminal and that corresponds to the multicast address, or in other words, sends duplicated first service data to a corresponding second terminal based on session information of the second terminal, to implement group communication between the first terminal and the at least one second terminal.

For example, the first terminal may be a lead vehicle in a V2X platoon, and each second terminal may be a member vehicle.

It should be noted that, that the first UPF entity duplicates the received first service data to obtain the N copies of first service data, and sends the duplicated first service data to each second terminal in step 104 may be the first UPF directly sends the duplicated first service data to each second terminal, or the first UPF entity indirectly sends the duplicated first service data to each second terminal, that is, the first UPF entity sends the duplicated first service data to each second terminal through a second UPF entity. For example, the first UPF entity first sends the first service data to the second UPF entity, and the second UPF entity sends the received data to the second terminal.

In some embodiments, the method in this embodiment may further include determining, by the SMF entity, each second UPF entity based on the address information of the at least one second terminal. The first UPF entity and each second UPF entity may be a same function entity or different function entities. For the foregoing two different application scenarios, the following uses several specific embodiments to further explain and describe the solution of this embodiment.

In this embodiment, the V2X AS/V2X-C sends the group route establishment request message to the SMF entity, the SMF entity determines the first UPF entity based on the address information of the first terminal, the SMF entity sends the first message to the first UPF entity, where the first message includes the multicast address of the group and the session information of the at least one second terminal, and the first UPF entity duplicates the received first service data to obtain the N copies of first service data, and sends the duplicated first service data to each second terminal based on the multicast address and the session information of the at least one second terminal. In this way, a wireless communication method applied to V2X can be implemented, thereby optimizing a vehicle to vehicle communication mode and a vehicle to infrastructure communication mode.

In addition, because the first UPF entity duplicates the first service data and sends the duplicated first service data to each second terminal, bandwidth consumed for communication between the first terminal and the at least one second terminal can be reduced in comparison with a one-to-one communication mode.

The following uses several specific embodiments to describe in detail the technical solution of the method embodiment shown in FIG. 3.

In the following several embodiments, an example in which the first terminal is UE1 and the at least one second terminal includes UE2 and UE3 is used for description.

Figure 4:
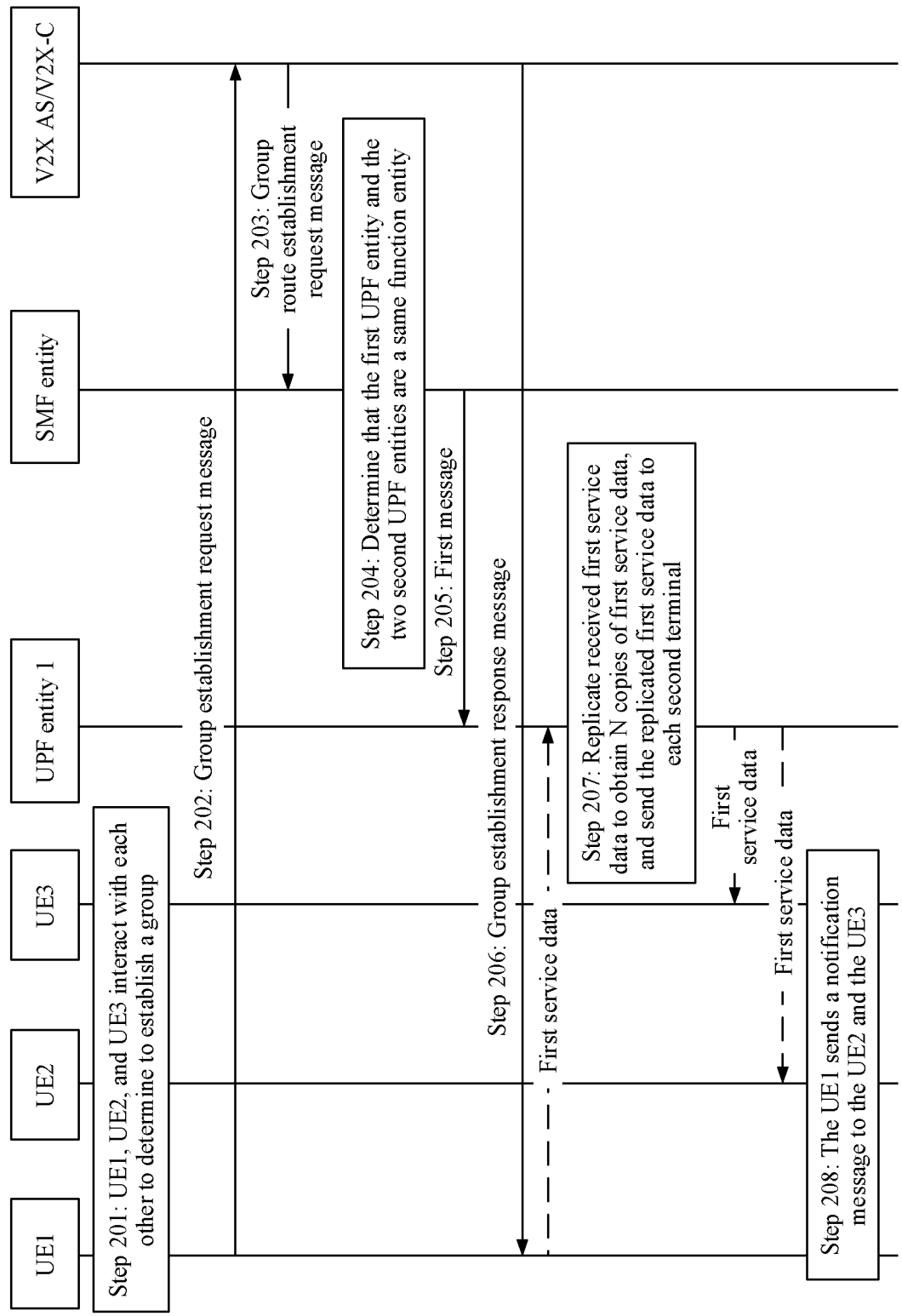
FIG. 4 is a flowchart of another wireless communication method according to an embodiment of this application.

FIG. 4 is a flowchart of another wireless communication method according to an embodiment of this application. In this embodiment, a first UPF entity and each second UPF entity are a same function entity. As shown in FIG. 4, the method in this embodiment may include the following steps.

Step 201. UE1, UE2, and UE3 interact with each other to determine to establish a group.

The UE1 serves as a first terminal, for example, a lead vehicle. There may be a plurality of specific implementations in which the UE1, the UE2, and the UE3 interact with each other to determine to establish the group. This is not limited in this embodiment of this application. For example, the UE1 may initiate group establishment, and instruct the UE2 and the UE3 to establish the group, the UE2 and the UE3 feed back a response message to the UE1 if the UE2 and the UE3 agree to establish the group, and the UE1 determines to establish the group. The group includes the UE1, the UE2, and the UE3.

Step 202. The UE1 sends a group establishment request message to V2X AS/V2X-C.

The V2X AS/V2X-C receives the group establishment request message sent by the UE1. The group establishment request message includes address information of the UE1, address information of the UE2, and address information of the UE3. That is, the V2X AS/V2X-C is requested to establish the group for the UE1, the UE2, and the UE3.

Step 203. The V2X AS/V2X-C sends a group route establishment request message to an SMF entity.

For details of the group route establishment request message, refer to the explanations and descriptions in step 101 in the embodiment shown in FIG. 3.

The V2X AS/V2X-C requests to establish a group route for the group, that is, to establish a sending path of service data in the group.

In an implementation, the group route establishment request message is explained in step 101 in the embodiment shown in FIG. 3, and the group route establishment request message includes the address information of the UE1, the address information of the UE2, and the address information of the UE3.

In another implementation, the group route establishment request message may further include a multicast address. The multicast address may be allocated by the V2X AS/V2X-C to the group. That is, the group route establishment request message includes the multicast address, the address information of the UE1, the address information of the UE2, and the address information of the UE3.

Step 204. The SMF determines a first UPF entity based on the address information of the UE1, determines two second UPF entities based on the address information of the UE2 and the address information of the UE3, and determines that the first UPF entity and the two second UPF entities are a same function entity.

In this embodiment, the first UPF entity and the two second UPF entities are a same function entity, namely, a UPF entity.

Step 205. The SMF entity sends a first message to the UPF entity.

The UPF entity receives the first message sent by the SMF entity. The first message includes the multicast address of the group and session information of at least one second terminal. The session information of the at least one second terminal may include information about a tunnel between a RAN of each second terminal and the first UPF entity, or address information of each second terminal.

The UPF entity may store, based on the first message, a group route corresponding to the multicast address, that is, establish, based on the first message, the group route corresponding to the multicast address. The group route includes the information about the tunnel between the RAN of each second terminal and the first UPF entity, or the address information of each second terminal. Then, when receiving first service data, the UPF entity may send the service data based on the group route. For specific explanations and descriptions, refer to specific explanations and descriptions of the following step 207.

In this embodiment, the session information of the at least one second terminal may include information about a tunnel between a RAN of the UE2 and the UPF entity and information about a tunnel between a RAN of the UE3 and the UPF entity, or include the address information of the UE2 and the address information of the UE3.

Step 206. The V2X AS/V2X-C sends a group establishment response message to the UE1.

The UE1 receives the group establishment response message sent by the V2X AS/V2X-C. The group establishment response message includes the multicast address.

It can be understood that after storing the group route corresponding to the multicast address, the UPF entity may further send a response message to the SMF entity or the V2X AS/V2X-C. The response message is used to indicate that establishment of the group route is completed. The V2X AS/V2X-C performs step 206 based on the response message, and sends the multicast address to the UE1. A specific implementation of step 206 may be flexibly set as required.

Step 207. The UPF entity duplicates the received first service data to obtain N copies of first service data, and sends the duplicated first service data to each second terminal based on the multicast address and the session information of the at least one second terminal.

The UPF entity may store the group route corresponding to the multicast address. In an implementation, the group route includes the information about the tunnel between the RAN of each second terminal and the UPF entity, and the UPF entity duplicates the received first service data to obtain the N copies of first service data, and sends the duplicated first service data to each second terminal based on the group route corresponding to the multicast address.

In this embodiment, if the first UPF entity in which the UE1 is located, a second UPF entity in which the UE2 is located, and a second UPF entity in which the UE3 is located are a same function entity, the UPF establishes a correspondence between the multicast address, and the information about the tunnel between the RAN of the UE2 and the UPF entity and the information about the tunnel between the RAN of the UE3 and the UPF entity, that is, stores the group route corresponding to the multicast address. When receiving the first service data, the UPF entity may obtain the information about the tunnel between the RAN of the UE2 and the UPF entity and the information about the tunnel between the RAN of the UE3 and the UPF entity based on the group route corresponding to the multicast address. The UPF entity duplicates the received first service data to obtain two copies of first service data, and directly sends the duplicated first service data to each corresponding tunnel based on the information about the tunnel between the RAN of the UE2 and the UPF entity and the information about the tunnel between the RAN of the UE3 and the UPF entity, to send the duplicated first service data to the UE2 and the UE3.

In the foregoing implementation, the information about the tunnel between the RAN of each second terminal and the UPF entity included in the group route may be carried in the first message sent by the SMF. Alternatively, the first message may carry the address information of the UE2 and the address information of the UE3, and the UPF entity determines the information about the tunnel between the RAN of the UE2 and the UPF entity and the information about the tunnel between the RAN of the UE3 and the UPF entity based on the address information of the UE2 and the address information of the UE3.

In another implementation, the group route includes the address information of each second terminal, and the UPF entity duplicates the received first service data to obtain the N copies of first service data, and sends the duplicated first service data to each second terminal based on the group route corresponding to the multicast address.

In this embodiment, if the first UPF entity in which the UE1 is located, a second UPF entity in which the UE2 is located, and a second UPF entity in which the UE3 is located are a same function entity, the UPF establishes a correspondence between the multicast address, and the address information of the UE2 and the address information of the UE3, that is, stores the group route corresponding to the multicast address. When receiving the first service data, the UPF may obtain the address information of the UE2 and the address information of the UE3 based on the group route corresponding to the multicast address, duplicate the received first service data to obtain two copies of first service data, obtain corresponding tunnel information based on the address information of the UE2 and the address information of the UE3, and directly send the duplicated first service data to each corresponding tunnel, to send the duplicated first service data to the UE2 and the UE3.

Step 208. The UE1 sends a notification message to the UE2 and the UE3.

The notification message is used to notify the UE2 and the UE3 that the group is successfully established.

In an implementation, the notification message carries the multicast address. The UE2 and the UE3 may determine, based on the multicast address in the notification message, that first service data received by the UE2 and the UE3 is service data sent to the UE2 and the UE3.

In another implementation, the notification message does not carry the multicast address. Correspondingly, the first message may further carry first instruction information, and the first instruction information is used to instruct the first UPF entity to modify a destination address of each of the N copies of duplicated first service data to an address of one of the at least one second terminal. In this embodiment, the first instruction information is used to instruct the UPF entity to separately modify destination addresses of the N copies of duplicated first service data to an address of the UE2 and an address of the UE3.

The first UPF entity separately modifies the destination address of each of the N copies of duplicated first service data to the address of one of the at least one second terminal according to the first instruction information. In this embodiment, the UPF entity separately modifies the destination addresses of the N copies of duplicated first service data to the address of the UE2 and the address of the UE3 according to the first instruction information.

It should be noted that a sequence of step 207 and step 208 is not limited by a sequence number.

In this embodiment, the V2X AS/V2X-C sends the group route establishment request message to the SMF entity, the SMF entity determines the first UPF entity based on the address information of the first terminal, the SMF entity sends the first message to the first UPF entity, where the first message includes the multicast address of the group and the session information of the at least one second terminal, and the first UPF entity duplicates the received first service data to obtain the N copies of first service data, and sends the duplicated first service data to each second terminal based on the multicast address and the session information of the at least one second terminal. In this way, a wireless communication method applied to V2X can be implemented, thereby optimizing a vehicle to vehicle communication mode and a vehicle to infrastructure communication mode.

In addition, because the first UPF entity duplicates the first service data and sends the duplicated first service data to each second terminal, bandwidth consumed for communication between the first terminal and the at least one second terminal can be reduced in comparison with a one-to-one communication mode.

Figure 5A:
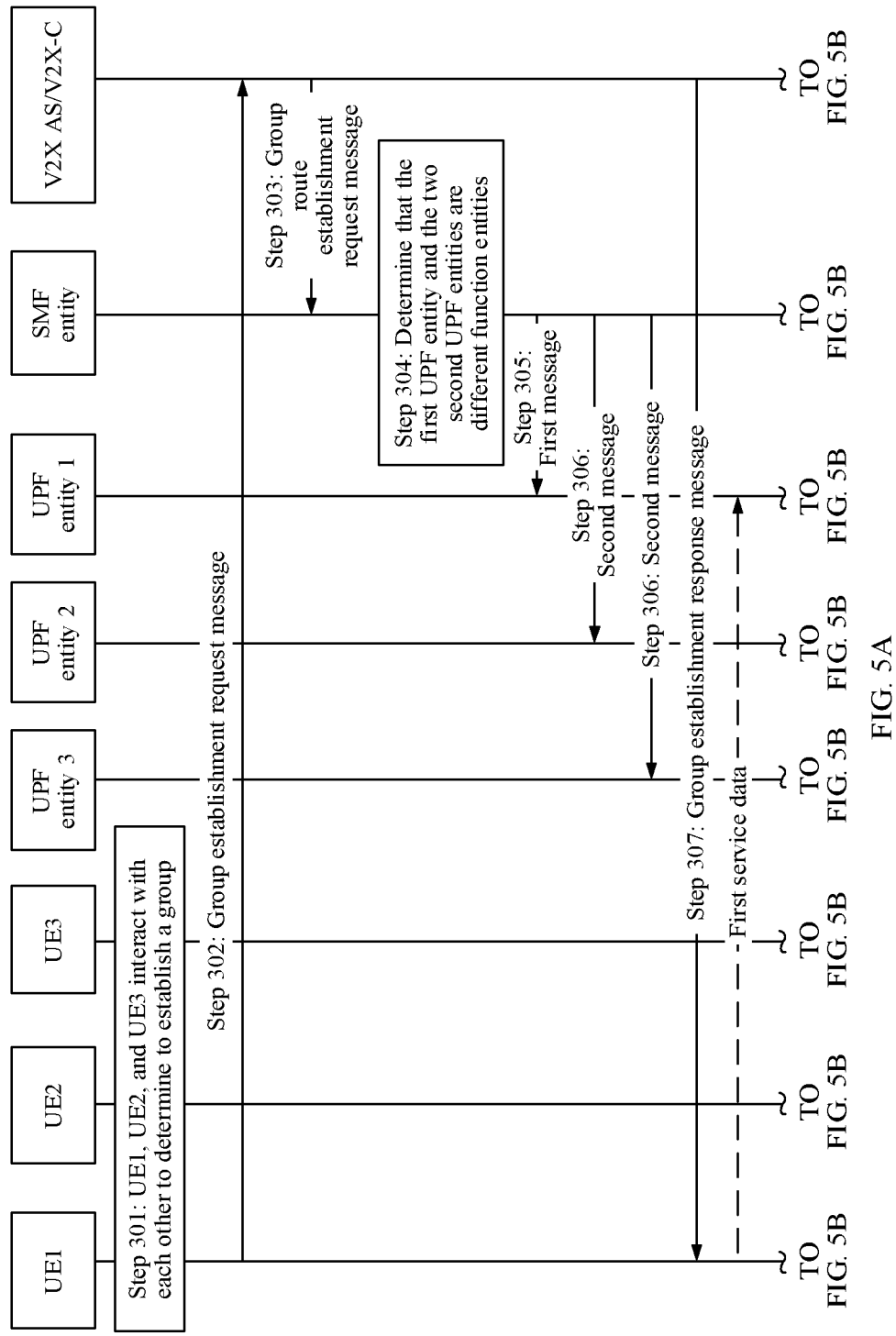
FIG. 5A and FIG. 5B are flowcharts of another wireless communication method according to an embodiment of this application.
Figure 5B:
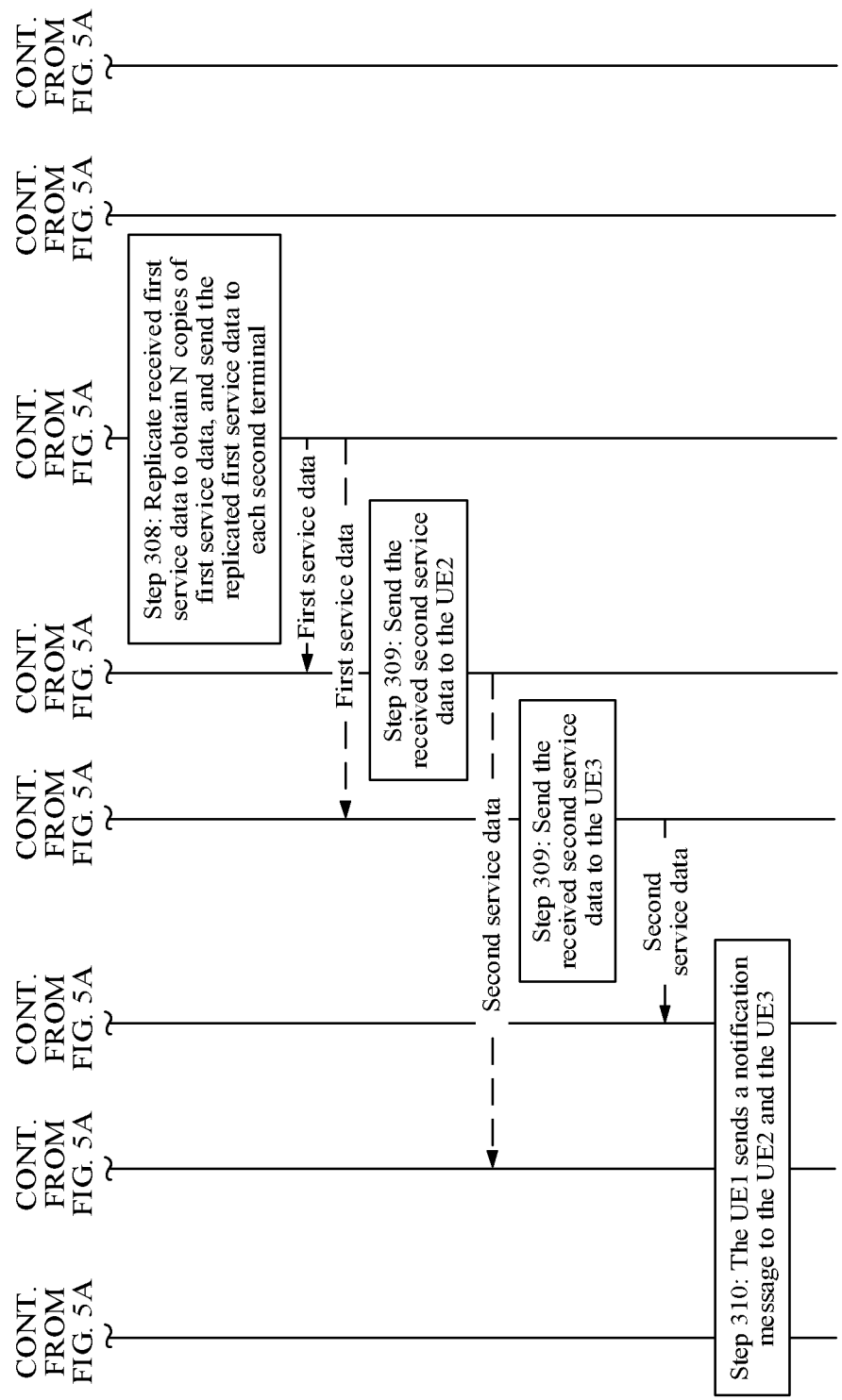

FIG. 5A and FIG. 5B are flowcharts of another wireless communication method according to an embodiment of this application. A difference between this embodiment and the embodiment shown in FIG. 4 lies in that a first UPF entity and each second UPF entity are different function entities. As shown in FIG. 5A and FIG. 5B, the method in this embodiment may include the following steps.

Step 301. UE1, UE2, and UE3 interact with each other to determine to establish a group.

Step 302. The UE1 sends a group establishment request message to V2X AS/V2X-C.

Step 303. The V2X AS/V2X-C sends a group route establishment request message to an SMF.

For specific explanations and descriptions of step 301 to step 303, refer to step 201 to step 203 in the embodiment shown in FIG. 4. Details are not described herein again.

Step 304. The SMF entity determines a first UPF entity based on address information of the UE1, determines two second UPF entities based on address information of the UE2 and address information of the UE3, and determines that the first UPF entity and the two second UPF entities are different function entities.

In this embodiment, the first UPF entity and the two second UPF entities are different function entities. In this embodiment, an example in which a second UPF entity in which the UE2 is located is a UPF entity 2 and a second UPF entity in which the UE3 is located is a UPF entity 3 is used for description.

The SMF entity establishes a sending tunnel between the first UPF entity and each second UPF entity by using the following step 305, step 306, and step 307.

Step 305. The SMF entity sends a first message to a UPF entity 1.

The UPF entity 1 receives the first message sent by the SMF entity. The first message includes a multicast address of a group and session information of at least one second terminal, and the session information of the at least one second terminal may include information about a tunnel between a second UPF entity in which each second terminal is located and the first UPF entity, or address information of each second terminal and information about a tunnel between a second UPF entity in which each second terminal is located and the first UPF entity.

The UPF entity 1 may store, based on the first message, a group route corresponding to the multicast address. The group route includes the session information of the at least one second terminal. Then, when receiving first service data, the UPF entity 1 may send the service data based on the group route. For specific explanations and descriptions, refer to specific explanations and descriptions of the following step 307.

In this embodiment, the session information of the at least one second terminal may include information about a tunnel between the UPF entity 2 and the UPF entity 1 and information about a tunnel between the UPF entity 3 and the UPF entity 1, or includes the address information of the UE2, information about a tunnel between the UPF entity 2 and the UPF entity 1, the address information of the UE3, and information about a tunnel between the UPF entity 3 and the UPF entity 1.

Step 306. The SMF entity sends a second message to each of the UPF entity 2 and the UPF entity 3.

In this embodiment, the SMF entity sends the second message to the UPF entity 2. The second message includes the information about the tunnel between the UPF entity 2 and the UPF entity 1, the second message is further used by the UPF entity 2 to send received second service data to the UE2, and the second service data is from the tunnel corresponding to the information about the tunnel between the UPF entity 2 and the UPF entity 1.

The SMF entity sends the second message to the UPF entity 3. The second message includes the information about the tunnel between the UPF entity 3 and the UPF entity 1, the second message is further used by the UPF entity 3 to send received second service data to the UE3, and the second service data is from the tunnel corresponding to the information about the tunnel between the UPF entity 3 and the UPF entity 1.

It should be noted that the second service data is duplicated first service data that arrives at each second UPF entity.

Step 307. The V2X AS/V2X-C sends a group establishment response message to the UE1.

For specific explanations and descriptions of step 307, refer to step 206 in the embodiment shown in FIG. 4. Details are not described herein again.

Step 308. The UPF entity 1 duplicates the received first service data to obtain N copies of first service data, and sends the duplicated first service data to each second terminal based on the multicast address and the session information of the at least one second terminal.

The UPF entity 1 (the first UPF entity) may store the group route corresponding to the multicast address. The group route includes information about a tunnel between a UPF entity in which each second terminal is located and the first UPF entity, or the address information of each second terminal and information about a tunnel between a UPF entity in which each second terminal is located and the first UPF entity. The UPF entity 1 duplicates the received first service data to obtain the N copies of first service data, and sends the duplicated first service data to each second terminal based on the group route corresponding to the multicast address.

Specifically, because the first UPF entity and each second UPF entity are different function entities, a tunnel between the first UPF entity and each second UPF entity needs to be established to send service data. The SMF sends the multicast address and the information about the tunnel between the second UPF entity in which each second terminal is located and the first UPF entity to the first UPF entity, and sends the information about the tunnel between the second UPF entity in which the second terminal is located and the first UPF entity to the corresponding second UPF entity, to establish the tunnel between the first UPF entity and each second UPF entity.

To duplicate and send the first service data, the first UPF entity establishes a correspondence between the multicast address and the session information of each second terminal, that is, stores the group route corresponding to the multicast address. The group route includes the information about the tunnel between the second UPF entity in which each second terminal is located and the first UPF entity, or the information about the tunnel between the second UPF entity in which each second terminal is located and the first UPF entity and the address information of each second terminal.

In this embodiment, the UPF entity 1 establishes a correspondence between the multicast address, and session information of the UE2 and session information of the UE3, that is, stores the group route corresponding to the multicast address. The group route includes information about a tunnel between the UPF entity 2 and the UPF entity 1 and information about a tunnel between the UPF entity 3 and the UPF entity 1, or the group route includes the address information of the UE2, information about a tunnel between the UPF entity 2 and the UPF entity 1, the address information of the UE3, and information about a tunnel between the UPF entity 3 and the UPF entity 1. When receiving the first service data, the UPF entity 1 may obtain the information about the tunnel between the UPF entity 2 and the UPF entity 1 and the information about the tunnel between the UPF entity 3 and the UPF entity 1 or obtain the address information of the UE2, the information about the tunnel between the UPF entity 2 and the UPF entity 1, the address information of the UE3, and the information about the tunnel between the UPF entity 3 and the UPF entity 1 based on the group route corresponding to the multicast address. The UPF entity 1 duplicates the received first service data to obtain two copies of first service data, send the duplicated first service data to the UPF entity 2 and the UPF entity 3 based on the information about the tunnel between the UPF entity 2 and the UPF entity 1 and the information about the tunnel between the UPF entity 3 and the UPF entity 1, to send the duplicated first service data to the UE2 through the UPF entity 2 and send the duplicated first service data to the UE3 though the UPF entity 3.

Step 309. The UPF entity 2 sends the received second service data to the UE2, and the UPF entity 3 sends the received second service data to the UE3.

It should be noted that a sequence of step 305 and step 306 is not limited by a sequence number.

Step 310. The UE1 sends a notification message to the UE2 and the UE3.

For specific explanations and descriptions of step 310, refer to step 208 in the embodiment shown in FIG. 4. Details are not described herein again.

It should be noted that the first message may further include session information of a first terminal, and the session information of the first terminal includes information about a tunnel between a RAN of the first terminal and the first UPF entity, or address information of the first terminal. In this embodiment, the session information of the first terminal includes information about a tunnel between a RAN of the UE1 and the UPF entity 1, or the address information of the UE1.

The second message further includes information about a tunnel between a RAN of a second terminal X and a second UPF entity in which the second terminal X is located, or address information of a second terminal X. The second terminal X is any one of the at least one second terminal. In this embodiment, the second message further includes information about a tunnel between a RAN of the UE2 and the UPF entity 2 and information about a tunnel between a RAN of the UE3 and the UPF entity 3, or the address information of the UE2 and the address information of the UE3.

In this embodiment, the V2X AS/V2X-C sends the group route establishment request message to the SMF entity, the SMF entity determines the first UPF entity based on the address information of the first terminal, determines the two second UPF entities based on the address information of the UE2 and the address information of the UE3, and determines that the first UPF entity and the two second UPF entities are different function entities, the SMF entity sends the first message to the first UPF entity, where the first message includes the multicast address of the group and the session information of the at least one second terminal, the SMF entity sends the second message to the second UPF entity in which each second terminal is located, and the first UPF duplicates the received first service data to obtain the N copies of first service data, and sends the duplicated first service data to each second terminal through the second UPF entity in which each second terminal is located based on the multicast address and the session information of the at least one second terminal. In this way, a wireless communication method applied to V2X can be implemented, thereby optimizing a vehicle to vehicle communication mode and a vehicle to infrastructure communication mode.

In addition, because the first UPF duplicates the first service data and sends the duplicated first service data to each second terminal, bandwidth consumed for communication between the first terminal and the at least one second terminal can be reduced in comparison with a one-to-one communication mode.

It can be understood that in the foregoing embodiments, the method or the steps implemented by the first UPF entity may be alternatively implemented by a chip in the first UPF entity. The method or the steps implemented by the SMF entity may be alternatively implemented by a chip in the SMF entity. The method or the steps implemented by the second UPF entity may be alternatively implemented by a chip in the second UPF entity.

Figure 6:
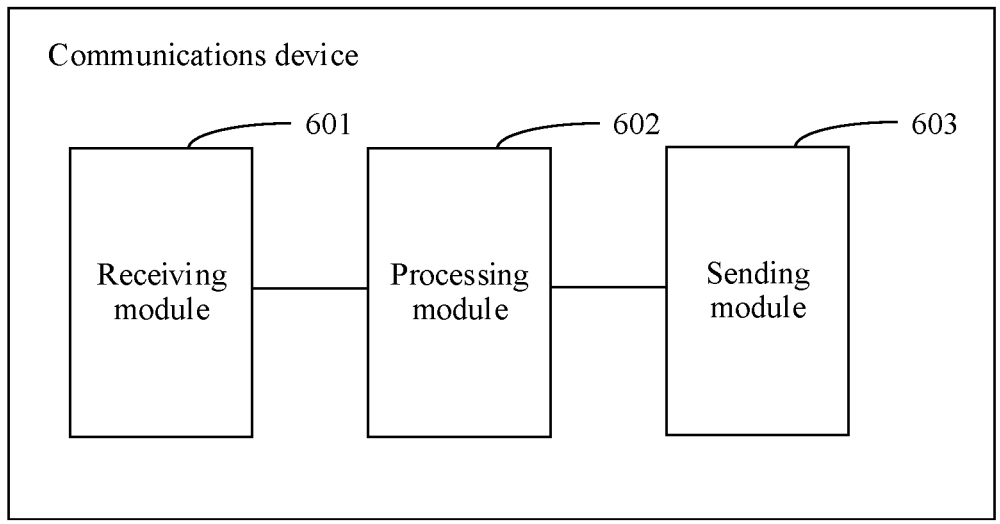
FIG. 6 is a schematic structural diagram of a communications device according to an embodiment of this application.

FIG. 6 is a schematic structural diagram of a communications device according to an embodiment of this application. As shown in FIG. 6, the communications device in this embodiment serves as a first UPF entity and includes a receiving module 601, a processing module 602, and a sending module 603.

The receiving module 601 is configured to receive a first message sent by an SMF entity, where the first message includes a multicast address of a group and session information of at least one second terminal.

The processing module 602 is configured to duplicate received first service data to obtain N copies of first service data, and send the duplicated first service data to each second terminal through the sending module 603 based on the multicast address and the session information of the at least one second terminal.

The first service data is data that is from a first terminal and whose destination address is the multicast address, and N is a total quantity of the at least one second terminal.

In some embodiments, the session information of the at least one second terminal includes information about a tunnel between a RAN of each second terminal and the first UPF entity. The processing module 602 is configured to store a group route corresponding to the multicast address, where the group route includes the information about the tunnel between the RAN of each second terminal and the first UPF entity, and duplicate the received first service data to obtain the N copies of first service data, and send the duplicated first service data to each second terminal through the sending module 603 based on the group route corresponding to the multicast address.

In some embodiments, the session information of the at least one second terminal includes address information of each second terminal. The processing module 602 is configured to store a group route corresponding to the multicast address, where the group route includes the address information of each second terminal, and obtain the address information of each second terminal based on the group route corresponding to the multicast address, determine information about a tunnel between a RAN of each second terminal and the first UPF entity based on the address information of each second terminal, duplicate the received first service data to obtain the N copies of first service data, and send the duplicated first service data to each second terminal through the tunnel corresponding to the information about the tunnel between the RAN of each second terminal and the first UPF entity.

In some embodiments, the session information of the at least one second terminal includes information about a tunnel between a second UPF entity in which each second terminal is located and the first UPF entity. The processing module 602 is configured to store a group route corresponding to the multicast address, where the group route includes the information about the tunnel between the second UPF entity in which each second terminal is located and the first UPF entity, and duplicate the received first service data to obtain the N copies of first service data, and send, through the sending module 603, the duplicated first service data to each second terminal through the second UPF entity in which each second terminal is located based on the group route corresponding to the multicast addressduplica.

In some embodiments, the session information of the at least one second terminal includes address information of each second terminal and information about a tunnel between a second UPF entity in which each second terminal is located and the first UPF. The processing module 602 is configured to store a group route corresponding to the multicast address, where the group route includes the address information of each second terminal and the information about the tunnel between the second UPF entity in which each second terminal is located and the first UPF entity, and duplicate the received first service data to obtain the N copies of first service data, and send the duplicated first service data to each second terminal through the sending module 603 based on the group route corresponding to the multicast address.

In some embodiments, the first message further includes first instruction information, and the processing module 602 is further configured to modify a destination address of each of the N copies of duplicated first service data to an address of one of the at least one second terminal according to the first instruction information.

The first UPF entity described above in this embodiment may be configured to perform the technical solution performed by the first UPF entity/the chip in the first UPF entity in the foregoing method embodiment. An implementation principle and a technical effect of this embodiment are similar to those of the method embodiment. For functions of the modules, refer to the corresponding descriptions in the method embodiment. Details are not described herein again.

Figure 7:
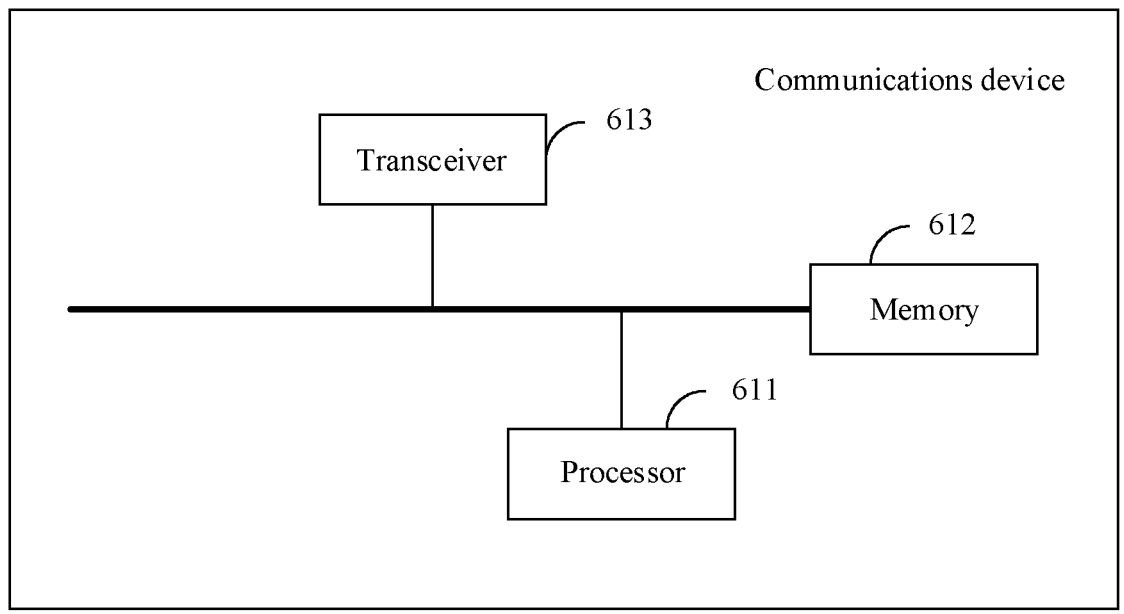
FIG. 7 is a schematic structural diagram of a communications device according to another embodiment of this application.

FIG. 7 is a schematic structural diagram of a communications device according to another embodiment of this application. As shown in FIG. 7, the communications device in this embodiment serves as a first UPF entity and includes a transceiver 611 and a processor 612.

In hardware implementation, the receiving module 601 and the sending module 603 may be the transceiver 611 in this embodiment. Alternatively, the transceiver 611 includes a receiver and a transmitter. In this case, the receiving module 601 may be the receiver in the transceiver 611, and the sending module 603 may be the transmitter in the transceiver 611. The processing module 602 may be built in or independent of the processor 612 of the first UPF entity in a hardware form.

The transceiver 611 may include a necessary radio frequency communication component such as a frequency mixer. The processor 612 may include at least one of a central processing unit (CPU), a digital signal processor (DSP), a microcontroller unit (MCU), an application-specific integrated circuit (ASIC), or a field-programmable gate array (FPGA).

Optionally, the first UPF entity in this embodiment may further include a memory 613. The memory 613 is configured to store a program instruction, and the processor 612 is configured to invoke the program instruction in the memory 613 to perform the foregoing solution.

The program instruction may be implemented in a form of a software functional unit and can be sold or used as an independent product. The memory 613 may be a computer readable storage medium in any form. Based on such an understanding, all or some of the technical solutions of this application may be embodied in a form of a software product, and the software product includes several instructions for instructing a computer device, which may be specifically the processor 612, to perform all or some of the steps of the first UPF entity in the embodiments of this application. The foregoing computer readable storage medium includes any medium that can store program code, such as a Universal Serial Bus (USB) flash drive, a removable hard disk, a read-only memory (ROM), a random-access memory (RAM), a magnetic disk, or an optical disc.

The first UPF entity described above in this embodiment may be configured to perform the technical solution performed by the first UPF entity/the chip in the first UPF entity in the foregoing method embodiment. An implementation principle and a technical effect of this embodiment are similar to those of the method embodiment. For functions of the components, refer to the corresponding descriptions in the method embodiment. Details are not described herein again.

Figure 8:
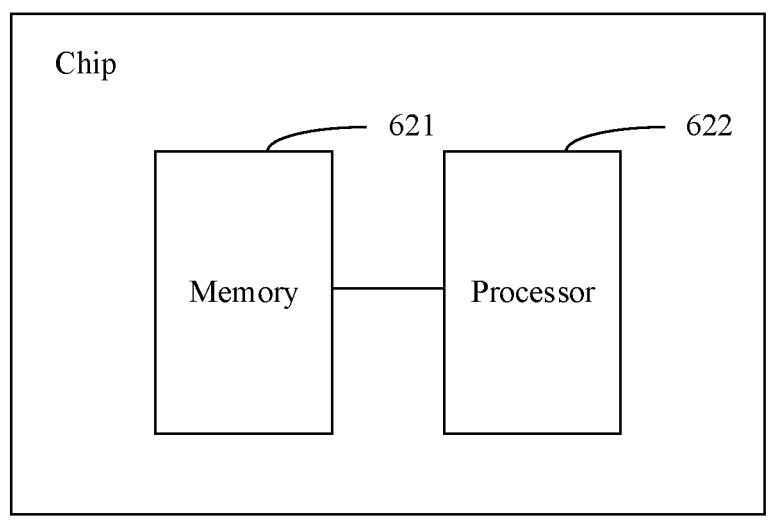
FIG. 8 is a schematic structural diagram of a chip according to an embodiment of this application.

FIG. 8 is a schematic structural diagram of a chip according to an embodiment of this application. As shown in FIG. 8, the chip in this embodiment may serve as a chip of a first UPF entity, and the chip in this embodiment may include a memory 621 and a processor 622. The memory 621 is communicatively connected to the processor 622.

In hardware implementation, the receiving module 601, the processing module 602, and the sending module 603 may be built in or independent of the processor 622 of the chip in a hardware form.

The memory 621 is configured to store a program instruction, and the processor 622 is configured to invoke the program instruction in the memory 621 to perform the foregoing solution.

The chip in this embodiment may be configured to perform the technical solution of the first UPF entity or the chip in the first UPF entity in the foregoing method embodiment of this application. An implementation principle and a technical effect of this embodiment are similar to those of the method embodiment. For functions of the modules, refer to the corresponding descriptions in the method embodiment. Details are not described herein again.

Another embodiment of this application further provides a communications device. For a schematic structural diagram of the communications device, refer to FIG. 6. The communications device in this embodiment serves as an SMF entity and includes a receiving module, a processing module, and a sending module. The receiving module is configured to receive a group route establishment request message, where the group route establishment request message includes address information of a first terminal in a group and address information of at least one second terminal in the group.

The processing module is configured to determine a first UPF entity based on the address information of the first terminal.

The sending module is configured to send a first message to a first UPF entity, where the first message includes a multicast address of the group and session information of the at least one second terminal, and the first message is used by the first UPF entity to send received first service data to each second terminal.

The first service data is data that is from the first terminal and whose destination address is the multicast address.

In some embodiments, the processing module is further configured to determine each second UPF entity based on the address information of the at least one second terminal, where when the first UPF entity and each second UPF entity are a same function entity, the session information of the at least one second terminal includes information about a tunnel between a RAN of each second terminal and the first UPF entity, or address information of each second terminal.

In some embodiments, the processing module is further configured to determine each second UPF entity based on the address information of the at least one second terminal, where when the first UPF entity and each second UPF entity are different function entities, the session information of the at least one second terminal includes information about a tunnel between a second UPF entity in which each second terminal is located and the first UPF entity, or address information of each second terminal and information about a tunnel between a second UPF entity in which each second terminal is located and the first UPF entity.

In some embodiments, the sending module is further configured to send a second message to a second UPF entity in which a second terminal X in the at least one second terminal is located, where the second message includes information about a tunnel between the second UPF entity in which the second terminal X is located and the first UPF entity, the second message is further used by the second UPF entity in which the second terminal X is located to send received second service data to the second terminal X, and the second service data is from the tunnel corresponding to the information about the tunnel between the second UPF entity in which the second terminal X is located and the first UPF entity.

In some embodiments, the first message further includes first instruction information, and the first instruction information is used to instruct the first UPF entity to modify a destination address of each of N copies of duplicated first service data to an address of one of the at least one second terminal.

In some embodiments, the first message further includes session information of the first terminal, and the session information of the first terminal includes information about a tunnel between a RAN of the first terminal and the first UPF entity, or the address information of the first terminal.

In some embodiments, the second message further includes information about a tunnel between a RAN of the second terminal X and the second UPF entity in which the second terminal X is located, or address information of the second terminal X.

The communications device described above in this embodiment may be configured to perform the technical solution performed by the SMF entity/the chip in the SMF entity in the foregoing method embodiment. An implementation principle and a technical effect of this embodiment are similar to those of the method embodiment. For functions of the modules, refer to the corresponding descriptions in the method embodiment. Details are not described herein again.

Another embodiment of this application further provides a communications device. For a schematic structural diagram of the communications device, refer to the schematic structural diagram shown in FIG. 7. The communications device in this embodiment serves as an SMF entity. In hardware implementation, the receiving module and the sending module of the SMF entity in the foregoing embodiment may be a transceiver in this embodiment. Alternatively, a transceiver includes a receiver and a transmitter. In this case, the receiving module of the SMF entity in the foregoing embodiment may be the receiver in the transceiver, and the sending module of the SMF entity in the foregoing embodiment may be the transmitter in the transceiver. The processing module of the SMF entity in the foregoing embodiment may be built in or independent of a processor of the SMF entity in a hardware form.

The transceiver may include a necessary radio frequency communication component such as a frequency mixer. The processor may include at least one of a CPU, a DSP, an MCU, an ASIC, or an FPGA.

Optionally, the SMF entity in this embodiment may further include a memory. The memory is configured to store a program instruction, and the processor is configured to invoke the program instruction in the memory to perform the foregoing solution.

The program instruction may be implemented in a form of a software functional unit and can be sold or used as an independent product. The memory may be a computer readable storage medium in any form. Based on such an understanding, all or some of the technical solutions of this application may be embodied in a form of a software product, and the software product includes several instructions for instructing a computer device, which may be specifically the processor, to perform all or some of the steps of the SMF entity in the embodiments of this application. The foregoing computer readable storage medium includes any medium that can store program code, such as a USB flash drive, a removable hard disk, a ROM, a RAM, a magnetic disk, or an optical disc.

The communications device described above in this embodiment may be configured to perform the technical solution performed by the SMF entity/the chip in the SMF entity in the foregoing method embodiment. An implementation principle and a technical effect of this embodiment are similar to those of the method embodiment. For functions of the components, refer to the corresponding descriptions in the method embodiment. Details are not described herein again.

Another embodiment of this application further provides a chip. For a schematic structural diagram of the chip, refer to FIG. 8. The chip in this embodiment may serve as a chip of an SMF entity. The chip in this embodiment may include a memory and a processor. The memory is communicatively connected to the processor. The processor may include, for example, at least one of a CPU, a DSP, an MCU, an ASIC, or an FPGA.

In hardware implementation, the sending module and the receiving module of the SMF entity in the foregoing embodiments may be built in or independent of the processor of the chip in this embodiment in a hardware form.

The memory is configured to store a program instruction, and the processor is configured to invoke the program instruction in the memory to perform the foregoing solution.

The program instruction may be implemented in a form of a software functional unit and can be sold or used as an independent product. The memory may be a computer readable storage medium in any form. Based on such an understanding, all or some of the technical solutions of this application may be embodied in a form of a software product, and the software product includes several instructions for instructing a computer device, which may be specifically the processor, to perform all or some of the steps of the SMF entity in the embodiments of this application. The foregoing computer readable storage medium includes any medium that can store program code, such as a USB flash drive, a removable hard disk, a ROM, a RAM, a magnetic disk, or an optical disc.

The chip described above in this embodiment may be configured to perform the technical solution of the SMF entity or the chip in the SMF entity in the foregoing method embodiment of this application. An implementation principle and a technical effect of this embodiment are similar to those of the method embodiment. For functions of the modules, refer to the corresponding descriptions in the method embodiment. Details are not described herein again.

It should be noted that, in this embodiment of this application, module division is exemplary, and is merely a logical function division. In an embodiment, another division manner may be used. Functional modules in the embodiments of this application may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated unit may be stored in a computer-readable storage medium. Based on such an understanding, the technical solutions of this application essentially, or the part contributing to other approaches, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of this application. The foregoing storage medium includes any medium that can store program code, such as a USB flash drive, a removable hard disk, a ROM, a RAM, a magnetic disk, or an optical disc.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

What is claimed is:

1. A wireless communication method implemented by a first user plane function entity and comprising:
    receiving, from a session management function entity, a multicast address of a group and session information of second terminals, wherein the group comprises a first terminal and the second terminals, and wherein the session information comprises information about a tunnel between second user plane function entities in which the second terminals are located and the first user plane function entity;
    receiving, from the first terminal in the group, first service data, wherein a destination address of the first service data is the multicast address;
    duplicating, when the destination address of the first service data matches the multicast address of the group, the first service data to obtain copies of the first service data; and
    sending, to each terminal of the group except the first terminal and based on the multicast address and the session information, each of the copies of the first service data.

2. The wireless communication method of claim 1, wherein the session information further comprises address information of each of the second terminals, and wherein the wireless communication method further comprises:
    storing a group route corresponding to the multicast address, wherein the group route comprises the address information;
    obtaining the address information based on the group route; and
    further sending, through the tunnel corresponding to the information, each of the copies of the first service data.

3. The wireless communication method of claim 1, further comprising:
  storing a group route corresponding to the multicast address; and
  further sending, through the second user plane function entities and based on the group route, each of the copies of the first service data.

4. The wireless communication method of claim 1, wherein the session information further comprises address information of each of the second terminals, and wherein the wireless communication method further comprises:
  storing a group route corresponding to the multicast address, wherein the group route comprises the address information and the information; and
  further sending, based on the group route, each of the copies of the first service data.

5. The wireless communication method of claim 1, further comprising further sending each of the copies of the first service data indirectly through another entity.

6. A first user plane function entity comprising:
  a memory configured to store instructions; and
  a processor coupled to the memory and configured to execute the instructions to cause the first user plane function entity to:
    receive, from a session management function entity, a multicast address of a group and session information of second terminals, wherein the group comprises a first terminal and the second terminals, and wherein the session information comprises information about a tunnel between second user plane function entities in which the second terminals are located and the first user plane function entity;
    receive, from the first terminal, first service data, wherein a destination address of the first service data is the multicast address;
    duplicate, when the destination address of the first service data matches the multicast address of the group, the first service data to obtain copies of the first service data; and
    send, to each terminal of the group except the first terminal and based on the multicast address and the session information, each of the copies of the first service data.

7. The first user plane function entity of claim 6, wherein the session information further comprises address information of each of the second terminals, wherein the processor is further configured to execute the instructions to cause the first user plane function entity to:
  store a group route corresponding to the multicast address, wherein the group route comprises the address information;
  obtain the address information based on the group route; and
  further send each of the copies of the first service data through the tunnel corresponding to the information.

8. The first user plane function entity of claim 6, wherein the processor is further configured to execute the instructions to cause the first user plane function entity to:
  store a group route corresponding to the multicast address; and
  further send each of the copies of the first service data through the second user plane function entities and based on the group route.

9. The first user plane function entity of claim 6, wherein the session information further comprises address information of each of the second terminals, and wherein the processor is further configured to execute the instructions to cause the first user plane function entity to:
  store a group route corresponding to the multicast address comprising the address information and the information; and
  further send each of the copies of the first service data based on the group route.

10. The first user plane function entity of claim 6, wherein the processor is further configured to execute the instructions to cause the first user plane function entity to further send each of the copies of the first service data indirectly through another entity.

11. A wireless communication method comprising:
  sending, by a session management function entity to a first user plane function entity, a multicast address of a group and session information of second terminals, wherein the group comprises a first terminal and the second terminals, and wherein the session information comprises information about a tunnel between second user plane function entities in which the second terminals are located and the first user plane function entity;
  receiving, by the first user plane function entity and from the session management function entity, the multicast address and the session information;
  receiving, by the first user plane function entity and from the first terminal in the group, first service data, wherein a destination address of the first service data is the multicast address;
  duplicating, by the first user plane function entity when the destination address of the first service data matches the multicast address of the group, the first service data to obtain copies of the first service data; and
  sending, by the first user plane function entity, to each terminal of the group except the first terminal, and based on the multicast address and the session information, each of the copies of the first service data.

12. The wireless communication method of claim 11, wherein the session information further comprises address information of each of the second terminals, and wherein the wireless communication method further comprises:
  storing, by the first user plane function entity, a group route corresponding to the multicast address, wherein the group route comprises the address information;
  obtaining, by the first user plane function entity and on the group route, the address information; and
  further sending, by the first user plane function entity and through the tunnel corresponding to the information, each of the copies of the first service data.

13. The wireless communication method of claim 11, further comprising:
  storing, by the first user plane function entity, a group route corresponding to the multicast address; and
  further sending, by the first user plane function entity, each of the copies of the first service data to each of the second terminals, through the second user plane function entities, and based on the group route.

14. The wireless communication method of claim 11, wherein the session information further comprises address information of each of the second terminals, and wherein the wireless communication method further comprises:
  storing, by the first user plane function entity, a group route corresponding to the multicast address, wherein the group route comprises the address information and the information; and
  further sending, by the first user plane function entity and based on the group route, each of the copies of the first service data.

15. The wireless communication method of claim 11, further comprising further sending, by the first user plane function entity, each of the copies of the first service data indirectly through another entity.

16. A communication system comprising:
   a session management function entity configured to send a multicast address of a group and session information of second terminals, wherein the group comprises a first terminal and the second terminals, and wherein the session information comprises information about a tunnel between second user plane function entities in which the second terminals are located and a first user plane function entity; and
   the first user plane function entity configured to:
      receive, from the session management function entity, the multicast address and the session information;
      receive, from the first terminal in the group, first service data, wherein a destination address of the first service data is the multicast address;
      duplicate, when the destination address of the first service data matches the multicast address of the group, the first service data to obtain copies of the first service data; and
      send, to each terminal of the group except the first terminal and based on the multicast address and the session information, each of the copies of the first service data.

17. The communication system of claim 16, wherein the session information further comprises address information of each of the second terminals, and wherein the first user plane function entity is further configured to:
   store a group route corresponding to the multicast address, wherein the group route comprises the address information;
   obtain the address information based on the group route; and
   further send each of the copies of the first service data through the tunnel corresponding to the information.

18. The communication system of claim 16, wherein the first user plane function entity is further configured to:
   store a group route corresponding to the multicast address; and
   further send each of the copies of the first service data through the second user plane function entities and based on the group route.

19. The communication system of claim 16, wherein the session information further comprises address information of each of the second terminals, and wherein the first user plane function entity is further configured to:
   store a group route corresponding to the multicast address, wherein the group route comprises the address information and the information; and
   further send each of the copies of the first service data based on the group route.

20. The communication system of claim 16, wherein the first user plane function entity is further configured to further send each of the copies of the first service data indirectly through another entity.

* * * * *